United States Patent
Howe

(10) Patent No.: US 7,093,821 B2
(45) Date of Patent: Aug. 22, 2006

(54) FLUID FLOW CONTROL VALVE

(75) Inventor: Samuel Harold Howe, Carson City, NV (US)

(73) Assignee: Bruce Industries, Inc., Dayton, NV (US)

( * ) Notice: Subject to any disclaimer, the term of this patent is extended or adjusted under 35 U.S.C. 154(b) by 212 days.

(21) Appl. No.: 10/770,147

(22) Filed: Feb. 2, 2004

(65) Prior Publication Data

US 2005/0258391 A1 Nov. 24, 2005

(51) Int. Cl.
*F16K 31/44* (2006.01)

(52) U.S. Cl. .............. 251/218; 251/351; 251/352; 454/76; 454/154; 454/286

(58) Field of Classification Search ........ 251/351–352, 251/266–269, 218; 454/76, 154, 286
See application file for complete search history.

(56) References Cited

U.S. PATENT DOCUMENTS

| | | | |
|---|---|---|---|
| 1,879,320 A | * | 9/1932 | Klett .................... 251/252 |
| 2,672,806 A | * | 3/1954 | Vehige .................... 454/76 |
| 2,830,523 A | | 4/1958 | Vehige |
| 3,113,502 A | | 12/1963 | Kallel et al. |
| 3,542,492 A | | 11/1970 | Muella |
| 3,765,317 A | | 10/1973 | Lowe |
| 3,835,759 A | | 9/1974 | Lloyd |
| 4,716,818 A | | 1/1988 | Brown |
| 5,127,876 A | | 7/1992 | Howe et al. |
| 5,328,152 A | | 7/1994 | Castle |
| 5,399,119 A | | 3/1995 | Birk et al. |
| D373,184 S | | 8/1996 | Nishizawa |
| 5,567,230 A | | 10/1996 | Sinclair |
| 5,575,715 A | | 11/1996 | Norbury, Jr. et al. |
| 6,402,610 B1 | | 6/2002 | Gloisten |

* cited by examiner

*Primary Examiner*—John Bastianelli
(74) *Attorney, Agent, or Firm*—Brooks Kushman P.C.

(57) ABSTRACT

The present invention provides a fluid flow control valve for regulating the flow of fluid, and a method for assembling the valve. The fluid flow control valve includes a housing having a generally spherical exterior portion sized to pivotally cooperate within a coupling oriented at an opening of a pressurized fluid duct. A control member is provided having a retaining member received within an outlet end of a central bore of the housing. The control member is provided with a knob for manual rotation. A closure member is threadably engaged within the housing or the control member and is fixed for axial translation relative to the other. The closure member is further adapted to sealingly engage with an inlet end of the housing central bore. Rotation of the control member provides axial displacement to the closure member for varying flow of fluid therethrough.

20 Claims, 3 Drawing Sheets

FLUID FLOW CONTROL VALVE

BACKGROUND OF THE INVENTION

1. Field of the Invention

The invention relates generally to a valve for controlling the flow of fluid therethrough, particularly to a fluid flow control valve.

2. Background Art

Fluid flow control valves are conventionally utilized in the prior art for regulating the flow of fluids, such as water, air, or the like, in a tub, spa, passenger compartment or other environments where control of fluid flow is desired.

A passenger service unit is a unit in a passenger compartment for providing services such as pressurized air through a fluid flow control valve, lighting, a call button and/or the like. Passenger service units are commonly provided in passenger compartments of vehicles such as aircraft, buses, trains, and wherever pressurized air or climate control is provided at a remote location. Passenger service units that provide climate control and/or pressurized air are utilized for providing comfort to the passenger and typically provide user selective operation thereof for obtaining a desired comfort level. Passenger service units that include pressurized air typically utilize ducting for providing pressurized air to the desired location. The ducting may include an inlet that terminates at a manifold, which receives at least one or plurality of fluid flow control valves. The ducting of manifolds for such prior art valves are well known in the art and are disclosed in assignee's U.S. Pat. No. 5,127,876 issued on Jul. 7, 1992 to Howe et al. and U.S. Pat. No. 5,328,152 issued to Castle on Jul. 12, 1994; both of these patents are incorporated in their entirety by reference herein.

The prior art fluid flow control valves are commonly tappet or poppet valves disposed in a spherical housing that is pivotally connected to the manifold of the fluid duct. The prior art valves typically include a control member accessible by the passenger for varying the amount of fluid flow permitted to pass through the fluid flow control valve. These valves are also typically pivotally connected to the manifold to permit the user to select a desired direction of the fluid flow. Accordingly, the valves of the prior art may be relatively complex in order to provide user selected direction and control of the amount of fluid flow, thus requiring many and/or complex components, which may be costly in light of the manufacturing processes and the materials required to provide these prior art fluid flow control valves.

Fluid flow control valves of the prior art are typically subjected to use and wear over time and may require replacement during the life of the passenger service unit.

Accordingly, it is a goal of the present invention to provide a simplified and low cost fluid flow control valve for regulating the flow of fluid in a passenger compartment.

SUMMARY OF THE INVENTION

An aspect of the present invention is to provide a fluid flow control valve for regulating the flow of fluid. The fluid flow control valve includes a housing having a generally spherical exterior portion sized to pivotally cooperate within a coupling oriented in an opening of a pressurized fluid duct. The housing has a central bore formed therethrough defining an inlet end and an outlet end. A control member has a knob extending from the housing outlet end to be gripped and rotated manually by a user. The control member includes at least one retaining member that extends from the knob into the housing outlet end to cooperate within the housing central bore thus fixing the control member for rotation relative to the housing. A closure member is threadably engaged within one of the housing or the control member and is fixed for axial translation relative to the other of the housing or the control member. The closure member is adapted to sealingly engage with the inlet end of the housing bore. Rotation of the control member varies the flow of fluid through the housing.

Another aspect of the invention is to provide a method for assembling a fluid flow control valve. The method includes the steps of providing a housing having a generally spherical exterior portion and an internally threaded bore therein. The method also includes installing an externally threaded closure member into the housing in threadable engagement therewith; and inserting at least one retaining member of a control member into the outlet end of the housing for fixing the control member for rotation relative to the housing and for connecting the closure member to the control member so that rotation of the control member displaces the closure member for varying the fluid of flow therethrough.

The above aspects and other aspects, objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
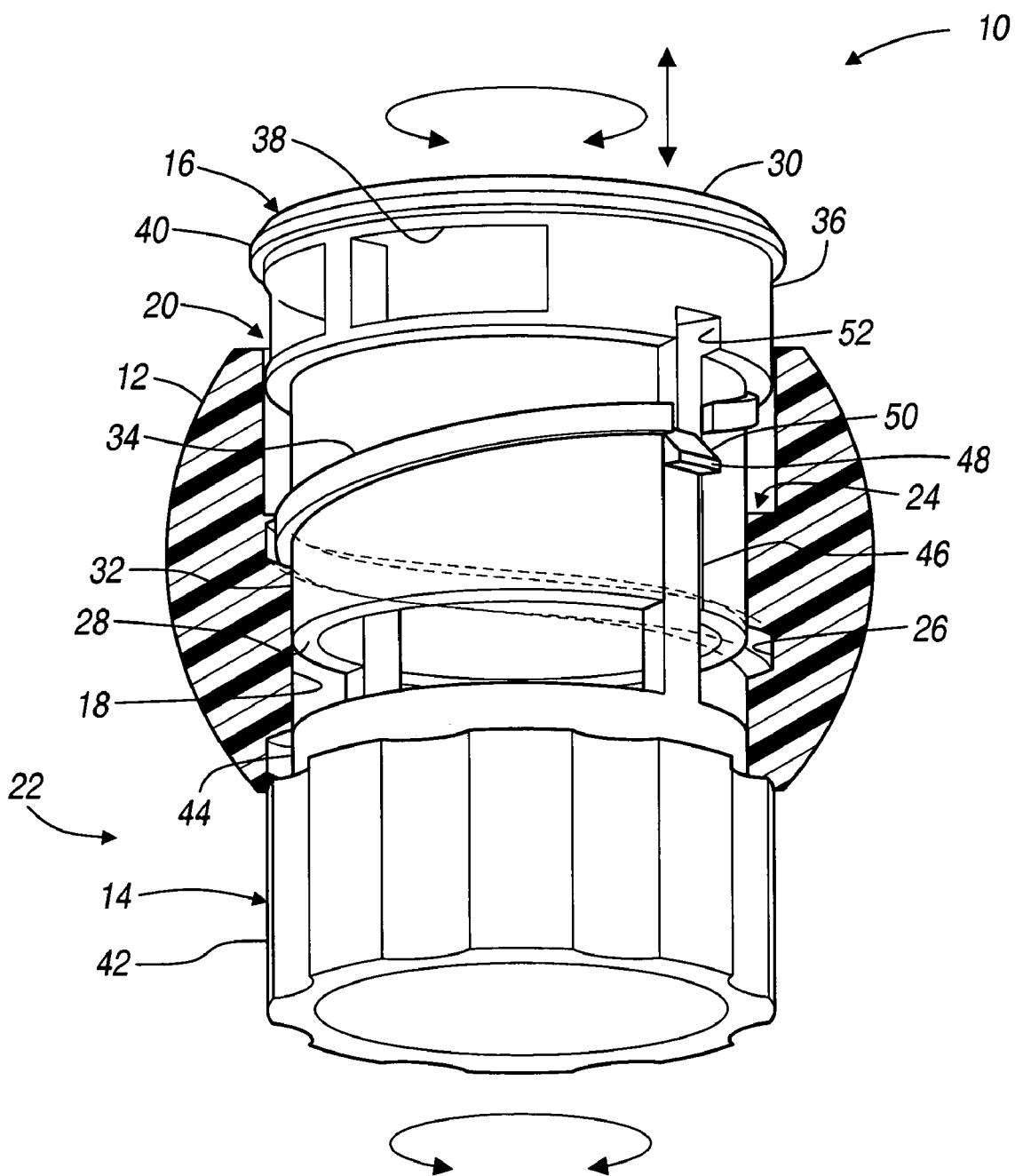
FIG. 1 is a partial section, perspective view of a preferred embodiment fluid flow control valve in accordance with the present invention, illustrated in an open orientation.
Figure 2:
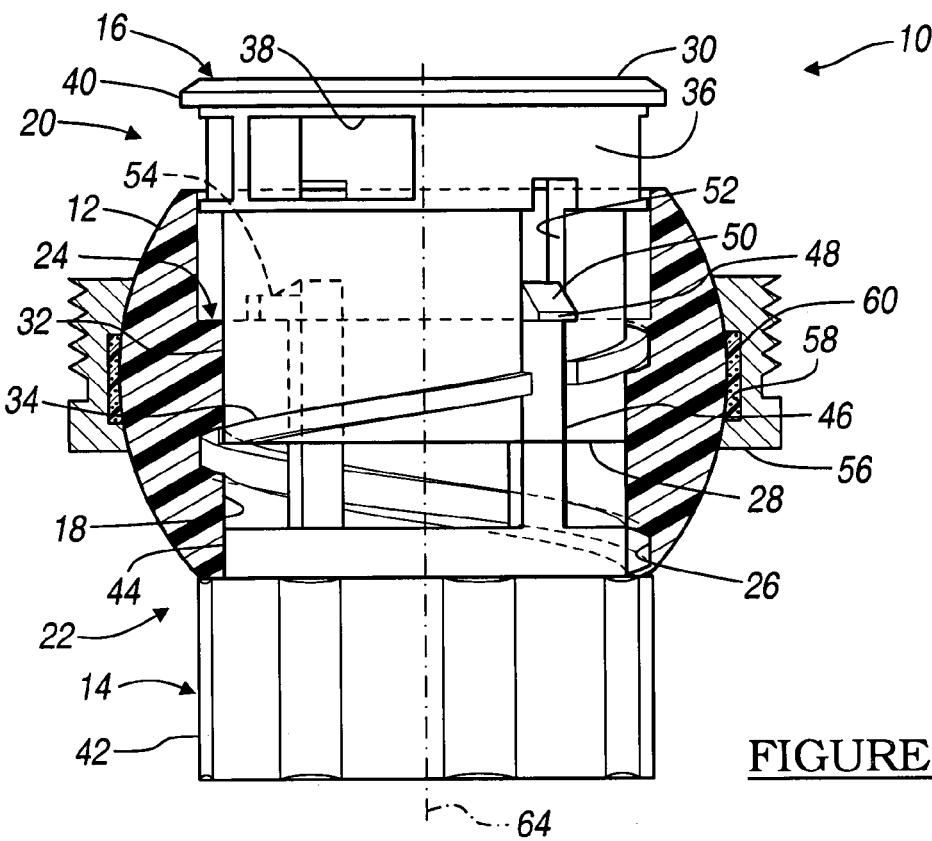
FIG. 2 is a side elevation, partial section view of the fluid flow control valve of FIG. 1, illustrated mounted within a coupling, and illustrated in the open orientation.
Figure 3:
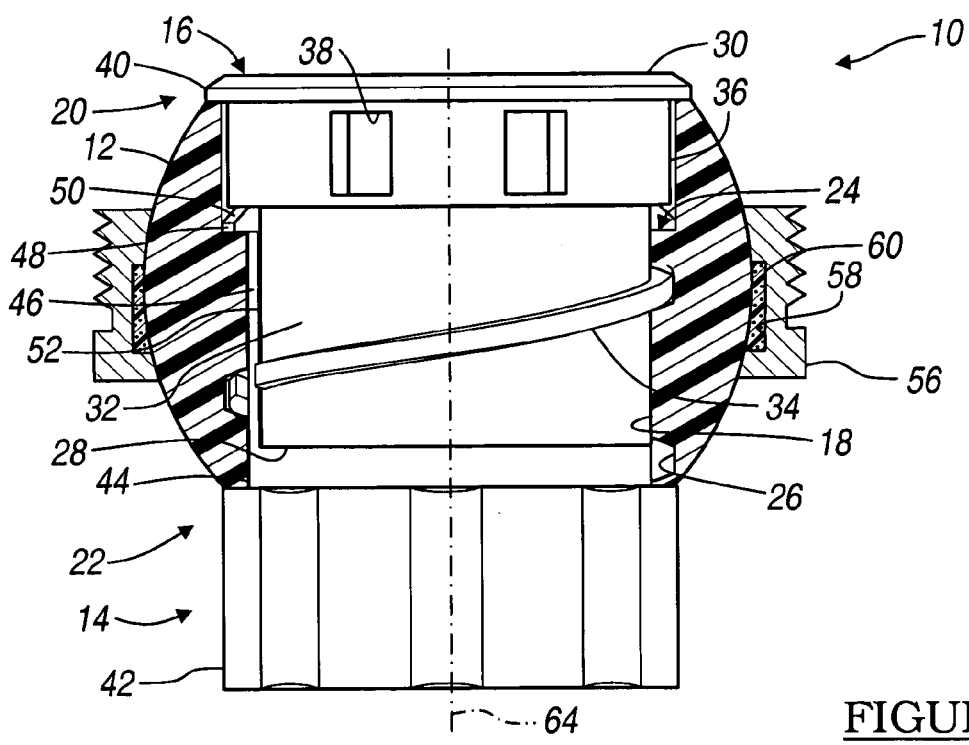
FIG. 3 is a side elevation, partial section view of the fluid flow control valve of FIG. 1, illustrated within the coupling, and illustrated in a closed orientation.

With reference now to FIGS. 1 through 3, a preferred embodiment fluid flow control valve is illustrated with accordance with the present invention, referenced generally by numeral 10. The valve 10 is provided for regulating the flow of fluid in a passenger compartment. The valve 10 of the preferred embodiment primarily and exemplarily includes three components, specifically a housing 12, a control member 14 and a closure member 16.

The preferred embodiment fluid flow control valve 10 is utilized for regulating the flow of air in the passenger compartment. Within the spirit and scope of the present invention, the fluid flow control valve may be utilized for regulating the flow of other fluids, such as water, a combination of water and air, or the like. The preferred embodiment fluid flow control valve 10 is illustrated and described with reference to the passenger compartment for exemplary purposes only without placing limitations to this environment. The present invention contemplates employing the fluid flow control valve in environments other than the passenger compartment, such as a tub, a hot tub, a spa, or the like.

Figure 4:
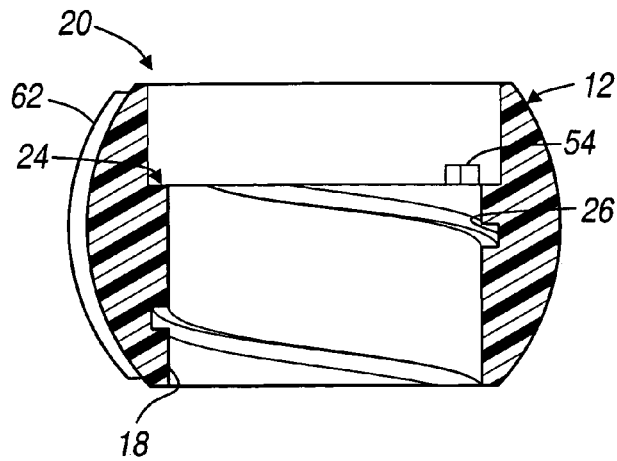
FIG. 4 is a partial section side view of a housing of the fluid flow control valve of FIG. 1.
Figure 5:
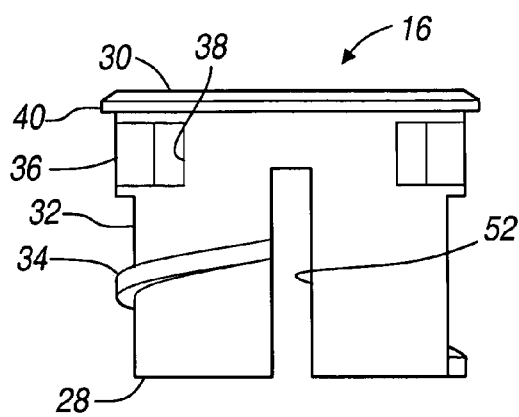
FIG. 5 is a side elevation view of a closure member of the fluid flow control valve of FIG. 1.
Figure 6:
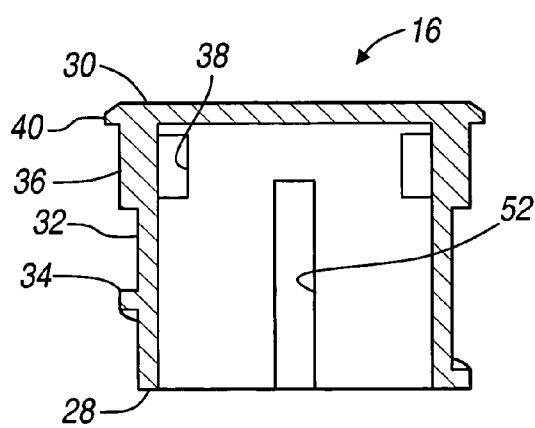
FIG. 6 is a side sectional view of the closure member of the fluid flow control valve of FIG. 1.
Figure 7:
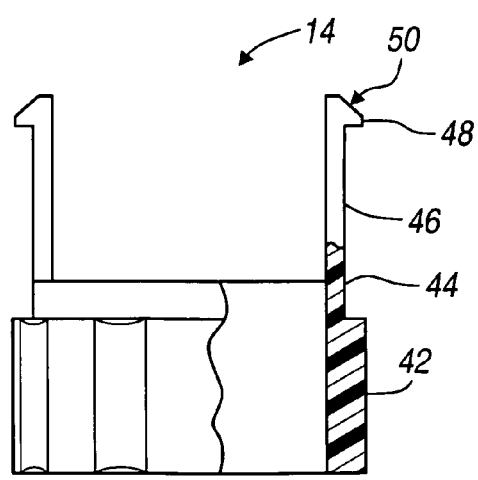
FIG. 7 is a side elevation partial section view of a control member of the fluid flow control valve of FIG. 1.

Referring to FIG. 4, in combination with FIGS. 1–3, the housing 12 has a generally spherical exterior portion that is sized to be mounted to a manifold of an associated pressurized fluid duct as is known in the prior art. The housing includes a central bore 18 formed therethrough for defining an inlet end 20 and an outlet end 22. The inlet end 20 of the housing 12 faces the pressurized fluid for receiving fluid into the valve 10. The outlet end 22 of the housing 12 faces the passenger compartment for permitting the pressurized fluid to pass through the valve 10 and exit into the passenger compartment. The inlet end 20 and the outlet end 22 of the housing 12 are both provided with planar surfaces to minimize the overall size of the housing 12 and to facilitate cooperation of the housing 12 with the control member 14 and closure member 16 in a compact fashion. The housing 12 of the preferred embodiment is formed from high strength plastic with a diameter of 1.5 inches and a dimension from the top surface of the inlet end 20 to the bottom surface of the outlet end 22 of approximately 1 inch. The housing central bore 18 varies in diameter, specifically enlarged near the inlet end 20 to provide an annular shoulder 24 formed therein that is spaced apart from the outlet end 22 and facing the inlet end 20. The housing central bore 18 further includes a helical groove 26 formed therein. The helical groove 26 is formed in the region of the central bore 18 between the annular shoulder 24 and the outlet end 22 of the preferred embodiment.

Referring now to FIGS. 1–3, and FIGS. 5 and 6, the closure member 16 is illustrated and will be described in greater detail. The closure member 16 has a generally tubular body having an open end 28 and a distal closed end 30. A lower region 32 of the closure member tubular body is sized to be received within the housing central bore 18. The lower region 32 includes an external helical projection 34 formed thereabout for threadably engaging within the helical groove 26 of the housing central bore 18. An upper region 36 of the body of the closure member 16 is sized to be received within the housing central bore 18 above the annular shoulder 24 and accordingly has an external tubular diameter greater than that of the lower region 32. The upper region 36 includes a plurality of apertures 38 formed through the side wall of the tubular body upper region 36 for permitting pressurized fluid to flow therethrough and into the housing 12.

The distal end 30 includes a cap 40 for closing the distal end 30 and permitting fluid from passing therethrough. The cap 40 has an overall diameter greater than that of the housing central bore 18 and the cap 40 includes a lower planar surface for seating upon the top planar surface of the housing inlet end 20. Upon threaded engagement of the helical projection 34 of the closure member 16 within the helical groove 26 of the housing 12, rotation of the closure member as indicated by an upper circular arrow in FIG. 1 consequently causes the closure member 16 to displace axially as illustrated by a vertical arrow in FIG. 1. The range of combined rotary and axial displacement of the closure member 16 is illustrated by comparison of the open orientation of the closure member 16 as illustrated in FIGS. 1 and 2 with the closed orientation of the closure member 16 as illustrated in FIG. 3. Thus, the cooperation of the closure member 16 and housing 12 cooperate as a poppet valve for permitting fluid to flow through the apertures 38 into the housing 12 in an open orientation of the closure member 16. In the closed orientation of FIG. 3, the cap 40 sealing engages with the upper surface of the housing inlet end thereby preventing fluid from passing through the valve 10.

Referring now to FIGS. 1–3 and FIG. 7, the control member 14 is illustrated in greater detail. The control member 14 is provided for permitting a user to control the axial displacement of the closure member 16 to thereby select an orientation of the closure member 16 between the fully open position and the fully closed position to receive maximum fluid flow, no fluid flow or any variation therebetween. For example, variable rates of fluid flow are provided by the valve 10 for various orientations wherein the closure member 16 is partially open, partially exposing the apertures 38 to the pressurized fluid.

The control member 14 includes a knob 42 oriented about a tubular sleeve 44 and a pair of axially extending clips 46 extending therefrom. The knob 42 and sleeve 44 are tubular with openings at each end so that fluid may pass from the housing 12 therethrough and out of the distal end of the knob 42. These components of the control member 14 are formed integrally from a high strength plastic material by a plastic injection molding process. The tubular sleeve 44 is sized to be received within the outlet end 22 of the housing central bore 18. The knob 42 has an overall dimension that is greater than the diameter of the housing central bore 18 such that the knob 42 extends from the housing 12 and includes an external gripping surface for facilitating rotary manipulation of the control member 14 by the user. The clips 46 extend within the housing central bore 18 and each include an outward radially extending tab 48 for engaging the annular shoulder 24 of the housing 12 and for retaining the control member 14 to the housing 12.

The tabs 48 are each provided with an external leading surface 50 formed thereon. Thus, as the valve 10 is assembled, the clips 46 are initially inserted into the outlet end 22 of the central bore 18. The tabs 48 have an overall lateral dimension greater than that of the central bore 18 and the leading edges 50 urge the clips 46 inward, flexing them along the axial length of each clip 46. The high strength plastic material of the control member 14 permits the flexing of the clips 46. Upon further insertion of the clips 46 into the central bore 18, the tabs 48 engage the annular shoulder 24 in an orientation of the control member 14 wherein the knob 42 is flush against the housing outlet end 22. Due to the characteristics of the control member 14 material, the clips 46 diverge to an unloaded orientation thus causing the tabs 48 to engage the annular shoulder 24 and lock the control member 14 to the housing 12.

The clips 46 are utilized to retain the control member 14 to the housing 12 and are concomitantly utilized for providing the rotational motion from the control member 14 to the closure member 16. Referring again to FIG. 1–3 and FIGS. 5 and 6, the closure member includes a pair of longitudinal slots 52 provided in the side wall of the tubular body at orientations corresponding with the clips 46. The longitudinal slots 52 each have an axial length that is sized to maintain engagement with the clips 46 through the range of axial displacement of the closure member 16. This range of axial displacement includes a limit in the closure direction that is provided by the engagement of the cap 40 to the inlet end 20 as illustrated in FIG. 3. Referring again to FIG. 4, the housing includes a radial stop 54 oriented on the annular shoulder 24. The radial stop 54 is oriented at a location to engage one of the tabs 48 in an orientation of the control member 14 that corresponds to a fully open orientation of the closure member 16. This engagement is illustrated hidden in FIG. 2. The radial stop 54 prevents continuous rotation of the control member 14 that would consequently result in disconnecting the threaded engagement between the closure member 16 and housing 12.

Referring again to FIGS. 2 and 3, the housing 12 is illustrated mounted within a coupling 56. The coupling 56 cooperates with the housing 12 in a ball and socket manner thereby permitting the valve 10 to pivot relative to the coupling 56. The coupling 56 includes an internal annular groove 58 having a resilient gasket 60 oriented therein. The gasket 60 provides a sealed engagement between the coupling 56 and the housing 12 to prevent leakage of pressurized fluid between this connection. The invention contemplates that the coupling 56 can be provided by any prior art coupling such as those provided in the U.S. Pat. Nos. 5,127,876 and 5,328,152 which have been incorporated by reference herein. The coupling 56 may be formed of a multi-piece design that is retained together upon being threaded into an opening in the pressurized fluid duct manifold.

Referring again to FIG. 4, the housing 12 includes an exterior radial projection 62 extending externally therefrom, and is illustrated rotated axially ninety degrees clockwise from the desired location of the preferred embodiment. The radial projection 62 cooperates within a groove (not shown) formed in the coupling 56. The groove in the coupling 56 partially constrains rotation of the housing 12 axially so that rotation of the control member 14 does not result in rotation of the entire valve 10. Accordingly, the groove in the coupling 56 is sufficiently oversized relative to the width of the radial projection 62 to thereby facilitate free pivotal motion of the housing 12 within the coupling 56 in a conventional ball and socket manner. The range of pivotal movement of the valve 10 is further limited by the knob 42, which extends from the housing 12 and may contact the coupling 56 defining the maximum angular displacement of the housing 12 relative to a central axis 64 of the coupling 56.

In summary, the present invention provides a simplified fluid flow control valve 10 that minimizes the number of components and the manufacturing processes and materials required to provide a fluid flow control valve 10 for a passenger service unit. The fluid flow control valve 10 is assembled by providing the housing 12 and installing the closure member 16 therein by threadably engaging the helical projection 34 within the housing central bore helical groove 26. Accordingly, the control member 14 is aligned with the closure member 16, specifically so that the slots 52 receive the clips 46, and the control member 14 is installed by inserting the clips 46 into the outlet end of the housing 12. Subsequently, the fluid flow control valve 10 is mounted within the coupling 56 for installation into the pressurized fluid duct. Accordingly, if the fluid flow control valve 10 of the present invention receives sufficient use and wear, it may be readily replaced while incurring a minimalized cost of providing another simplified fluid control valve of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluid flow control valve for regulating the flow of fluid, the fluid flow control valve comprising:
    a housing having a generally spherical exterior portion sized to pivotally cooperate within a coupling oriented at an opening of a pressurized fluid duct, the housing having a central bore formed therethrough defining an inlet end and an outlet end, the housing having an annular shoulder spaced apart from the outlet end;
    a control member having a knob extending from the housing outlet end to be gripped and rotated manually, the control member including at least one axially extending clip extending from the knob into the housing outlet end and cooperating with the annular shoulder for fixing the control member for rotation relative to the housing; and
    a closure member having a first portion that is threadably engaged within one of the housing or the control member and the first portion is fixed for axial translation relative to the other of the housing or the control member, the closure member having a second portion that is adapted to sealingly engage with the inlet end of the housing central bore;
    wherein rotation of the control member in a first rotary direction causes the closure member second portion to extend axially from the inlet end due to the threadable engagement with one of the housing or the control member such that the closure member second portion becomes disengaged with the housing inlet end for permitting pressurized fluid to pass through the housing from the inlet end to the outlet end, and wherein rotation of the control member in a second rotary direction causes the closure member second portion to retract axially and engage the inlet end of the housing for limiting the flow of fluid therethrough.

2. The fluid flow control valve of claim 1, wherein the knob and the at least one axially extending clip of the control member are formed integrally.

3. The fluid flow control valve of claim 1, wherein the knob and the at least one axially extending clip of the control member are formed integrally by a plastic injection molding process.

4. The fluid flow control valve of claim 1, wherein the fluid is air.

5. The fluid flow control valve of claim 1, wherein the fluid flow control valve is oriented for user access in a passenger compartment.

6. The fluid flow control valve of claim 1, wherein the at least one axially extending clip further comprises a plurality of axially extending clips, wherein the closure member includes a tubular wall having a plurality of longitudinal slots, each slot being sized to receive one of the plurality of axially extending clips, such that the closure member is coupled for rotation with the control member, and the slots each have an axial length sized to permit the closure member to translate axially relative to the axially extending clips while maintaining the engagement of the slots and the corresponding axially extending clips.

7. The fluid flow control valve of claim 6, wherein the closure member tubular wall includes at least one radial aperture formed therethrough proximate to the closed end for permitting pressurized fluid to pass therethrough.

8. The fluid flow control valve of claim 1, wherein the at least one axially extending clip is further defined as a plurality of axially extending clips.

9. A fluid flow control valve for regulating the flow of fluid, the fluid flow control valve comprising:
    a housing having a generally spherical exterior portion sized to pivotally cooperate within a coupling oriented at an opening of a pressurized fluid duct, the housing having a central bore formed therethrough defining an inlet end and an outlet end;

a control member having a knob extending from the housing outlet end to be gripped and rotated manually, the control member including at least one retaining member extending from the knob into the housing outlet end and cooperating within the central bore for fixing the control member for rotation relative to the housing; and a closure member having a first portion that is threadably engaged within one of the housing or the control member and the first portion is fixed for axial translation relative to the other of the housing or the control member, the closure member having a second portion that is adapted to sealingly engage with the inlet end of the housing central bore;

wherein rotation of the control member in a first rotary direction causes the closure member second portion to extend axially from the inlet end due to the threadable engagement with one of the housing or the control member such that the closure member second portion becomes disengaged with the housing inlet end for permitting pressurized fluid to pass through the housing from the inlet end to the outlet end, and wherein rotation of the control member in a second rotary direction causes the closure member second portion to retract axially and engage the inlet end of the housing for limiting the flow of fluid therethrough;

wherein the at least one retaining member is further defined as a plurality of retaining members; and wherein the plurality of retaining members are further defined as a plurality of axially extending clips, each having an outward radially extending tab with a leading surface formed thereon, and the housing includes an annular shoulder spaced apart from the outlet end;

whereby upon initial insertion of the retaining members into the central bore outlet end, the leading surface of each of the plurality of retaining member tabs, engages the central bore for urging the respective tab inwards such that the tabs collectively converge; and whereby upon further insertion of the retaining members into the central bore outlet end, the retaining member tabs engage the annular shoulder and diverge thus providing axially abutting engagement with the annular shoulder for retaining the control member to the housing.

10. A fluid flow control valve for regulating the flow of fluid, the fluid flow control valve comprising:

a housing having a generally spherical exterior portion sized to pivotally cooperate within a coupling oriented at an opening of a pressurized fluid duct, the housing having a central bore formed therethrough defining an inlet end and an outlet end;

a control member having a knob extending from the housing outlet end to be gripped and rotated manually, the control member including at least one retaining member extending from the knob into the housing outlet end and cooperating within the central bore for fixing the control member for rotation relative to the housing; and a closure member having a first portion that is threadably engaged within one of the housing or the control member and the first portion is fixed for axial translation relative to the other of the housing or the control member, the closure member having a second portion that is adapted to sealingly engage with the inlet end of the housing central bore;

wherein rotation of the control member in a first rotary direction causes the closure member second portion to extend axially from the inlet end due to the threadable engagement with one of the housing or the control member such that the closure member second portion becomes disengaged with the housing inlet end for permitting pressurized fluid to pass through the housing from the inlet end to the outlet end, and wherein rotation of the control member in a second rotary direction causes the closure member second portion to retract axially and engage the inlet end of the housing for limiting the flow of fluid therethrough; and wherein the housing includes an annular shoulder spaced apart from the outlet end in cooperation with the at least one retaining member, and the annular shoulder includes a radial stop for providing a limit to a range of rotation of the control member relative to the housing.

11. A fluid flow control valve for regulating the flow of fluid, the fluid flow control valve comprising:

a housing having a generally spherical exterior portion sized to pivotally cooperate within a coupling oriented at an opening of a pressurized fluid duct, the housing having a central bore formed therethrough defining an inlet end and an outlet end, the central bore having an internal helical configuration formed therein, the housing having an annular shoulder spaced apart from the outlet end;

a closure member having a tubular wall with an open end received within the housing central bore inlet end and a distal closed end, the tubular wall including an external helical configuration cooperating with the housing internal helical configuration, the tubular wall including at least one radial aperture formed therethrough proximate to the closed end; and a control member having a knob extending from the housing outlet end to be gripped and rotated manually, the control member including a plurality of axially extending clips extending from the knob into the housing outlet end and cooperating with the annular shoulder for fixing the control member for rotation relative to the housing, the axially extending clips being operably connected to the closure member for relative rotation with the closure member;

wherein rotation of the control member in a first rotary direction causes the closure member to rotate in the first rotary direction and extend axially from the inlet end for permitting pressurized fluid to pass through the aperture in the closure member tubular wall, and subsequently through the housing, and wherein rotation of the control member in a second rotary direction causes the closure member to rotate in the second rotary direction and retract axially, thus retracting the aperture into the housing and limiting the flow of fluid through the tubular wall aperture and the housing.

12. A method for assembling a fluid flow control valve comprising:

providing a housing having a generally spherical exterior portion, an internally threaded bore formed therein, and an annular shoulder;

installing an externally threaded closure member into the housing such that the closure member is threadably engaged within the housing;

inserting at least one axially extending clip of a control member into the outlet end of the housing for engaging the annular shoulder, thereby fixing the control member for rotation relative to the housing and for operably connecting with the closure member such that rotation of the control member imparts rotation to the closure member for translating the closure member axially relative to the housing to vary the fluid flow therethrough.

13. The method for assembling a fluid flow control valve of claim 12, further comprising:
aligning the at least one axially extending clip with a corresponding configuration formed within the closure member.

14. The method for assembling a fluid flow control valve of claim 12, further comprising:
installing the housing within a coupling oriented at an opening of a pressurized fluid duct.

15. The fluid flow control valve of claim 1, wherein the housing annular shoulder includes a radial stop for providing a limit to a range of rotation of the control member relative to the housing.

16. The fluid flow control valve of claim 9, wherein the housing annular shoulder includes a radial stop for providing a limit to a range of rotation of the control member relative to the housing.

17. The fluid flow control valve of claim 1, wherein the at least one axially extending clip has an outward radially extending tab with a leading surface formed thereon.

18. The fluid flow control valve of claim 17 whereby upon initial insertion of the axially extending clip into the central bore outlet end, the leading surface of the tab engages the central bore for urging inwards.

19. The fluid flow control valve of claim 18 whereby upon further insertion of the axially extending clip into the central bore outlet end, the tab engages the annular shoulder and retracts thus providing axially abutting engagement with the annular shoulder for retaining the control member to the housing.

20. The fluid flow control valve of claim 11, wherein each of the plurality of axially extending clips has an outward radially extending tab with a leading surface formed thereon.

* * * * *